United States Patent [19]

Tanahashi et al.

[11] 4,140,094
[45] Feb. 20, 1979

[54] VAPORIZATION ACCELERATING APPARATUS FOR AN INTERNAL COMBUSTION ENGINE

[75] Inventors: Toshio Tanahashi; Futoshi Ide, both of Susono, Japan

[73] Assignee: Toyota Jidosha Kogyo Kabushiki Kaisha, Toyota, Japan

[21] Appl. No.: 787,755

[22] Filed: Apr. 15, 1977

Related U.S. Application Data

[63] Continuation of Ser. No. 649,526, Jan. 15, 1976, abandoned.

[51] Int. Cl.² .............................................. F02M 31/00
[52] U.S. Cl. .................. 123/122 AB; 123/122 AC; 261/144; 261/145
[58] Field of Search ................. 123/122 AB, 122 AC, 123/52 MV; 261/145, 144; 165/52 R

[56] References Cited

U.S. PATENT DOCUMENTS

| 1,676,955 | 7/1928 | Kemp | 123/122 AC |
| 2,259,480 | 10/1941 | Morris | 123/122 AB |
| 3,908,620 | 9/1975 | Takehiko | 123/122 AB |

FOREIGN PATENT DOCUMENTS 951522 3/1964 United Kingdom ............. 123/122 AB

Primary Examiner—Ronald H. Lazarus

[57] ABSTRACT

A vaporization accelerating apparatus includes an elongated guide pipe that extends from the carburetor of an internal combustion engine into the intake manifold thereof. A guide member in the form of an elongated plate is integral with the end of the guide pipe that is in the intake manifold. The guide member is planar and extends over and is substantially parallel to the planar riser of the internal combustion engine.

3 Claims, 3 Drawing Figures

EXAMPLE: CASE OF A 6-CYLINDER ENGINE

- DEVOID OF GUIDE PIPE
- PROVIDED ONLY WITH GUIDE PIPE
- PROVIDED WITH THE GUIDE NUMBER ACCORDING TO THE PRESENT INVENTION

VAPORIZATION ACCELERATING APPARATUS FOR AN INTERNAL COMBUSTION ENGINE

This is a continuation of application Ser. No. 649,526 now abandoned filed Jan. 15, 1976.

BACKGROUND OF THE INVENTION

1. Field of the Invention

The present invention relates to an intake manifold of an internal combustion engine, and more specifically, to a fuel vaporization accelerating apparatus for accelerating the vaporization of fuel.

2. Description of Prior Art

In case of conventional practice, a guide pipe was arranged in place in an intake manifold set at the lower end of a carburetor for the purpose of accelerating the vaporization of fuel, whereby mixed gas from the carburetor was led near to a riser. The said guide pipe was in the state of being suspended, with the flange section thereof set in place between the carburetor and a heat insulator fitted in place on the intake manifold. Therefore, the heat insulator was required to be subjected to machining or the like for the purpose of having the flange section set in place thereon in a proper manner. Furthermore, the mixed gas led through the guide pipe was soon subjected to diffusion all over in the intake manifold, and was not thoroughly vaporized or heated, either, by the riser. Hence the prior art structure was defective in terms of the state of distribution of the mixed gas to respective cylinders or in terms of the uniformity of the air-to-fuel ratio.

SUMMARY OF THE INVENTION

The main purpose of the present invention is to provide a vaporization accelerating apparatus for an internal combustion engine as is well capable of being properly employed intact for a conventional intake manifold, completely free from need for specifically processing a heat insulator, as enables the mixed gas to be thoroughly vaporized and heated, and as keeps the state of the distribution and the air-to-fuel ratio of the mixed gas to be fed to respective cylinders on a uniform level.

The said purpose can be achieved by the application of the present invention in such a manner as is set forth below. A guide member is fitted in place on a guidepipe in opposition to a riser and is arranged in an intake manifold, in the wake or downstream of a carburetor. The guide member is arranged virtually in parallel to the riser, and spaced therefrom at a certain distance properly allowed between the both. As a result, the mixed gas from the carburetor flows through the space at high speed; therefore, thorough vaporization and heating of the mixed gas can be ensured, until the state of distribution and the air-to-fuel ratio of the mixed gas to be fed to respective cylinders are thereby improved considerably. The side of the guide member set in parallel to the riser is bent to thus form a footing, whereby the guide pipe is supported in a proper manner and the guide member can be employed intact for any conventional intake manifold, completely free of the need for subjecting the heat insulator to reworking or remachining.

Other purposes and the effects of the present invention will be self-evident in view of an illustration of the present invention whereof a detailed description is given below by making reference to the drawings attached hereto.

DETAILED DESCRIPTION OF THE INVENTION

Figure 1:
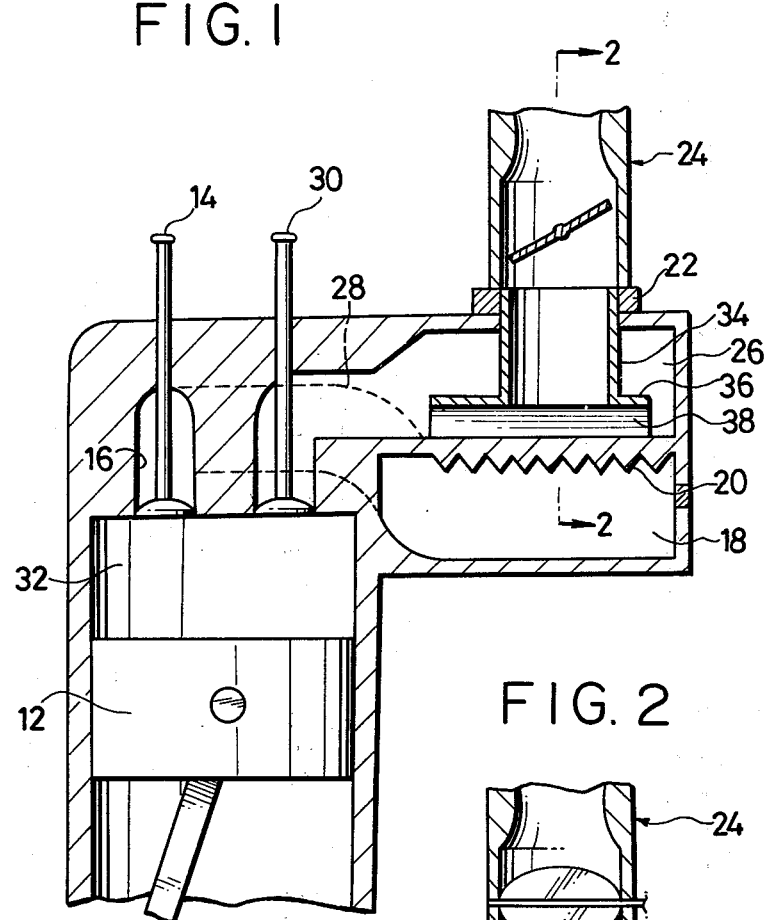
FIG. 1 is a front sectional view showing the vaporization accelerating apparatus for an internal combustion engine according to the present invention.
Figure 2:
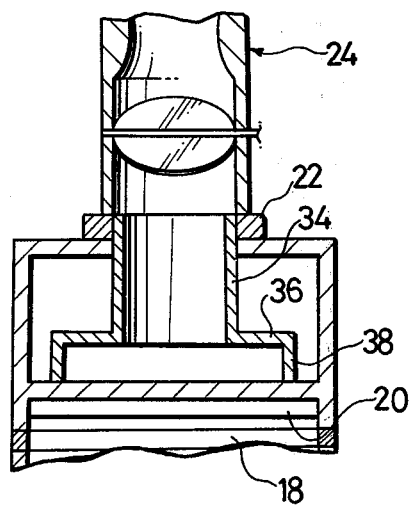
FIG. 2 is a side sectional view of portion of the guide member seen along the 2—2 line shown in FIG. 1.

FIG. 1 is a front sectional view of the vaporization accelerating apparatus for an internal combustion engine according to the present invention shown through an illustration, and FIG. 2 is a side sectional view of a proximate section of the guide member seen along the 2—2 line shown in FIG. 1.

As depicted in FIG. 1, when a piston 12 is thrust downward near to the dead point thereof in an explosion stroke, an exhaust valve 14 is caused to be opened by the action of a cam, and, when the piston 12 rises again, a high-temperature exhaust gas runs into an exhaust manifold 18 through an exhaust port 16, heats a riser 20, then is discharged into the atmosphere. Such a mixed gas as is generated by a carburetor 24 subjected to heat insulation from an intake or suction manifold 26 by a heat insulator 22 runs into the suction manifold 26, and is suctioned into a cylinder 32 therefrom through a suction port 28, when a suction valve 30 is opened.

Now that the mixed gas is led near to the riser 20 through a guide pipe 34 and the flow velocity thereof accelerated by such a guide member 36 according to the present invention, the mixed gas is thoroughly vaporized by the riser 20, and diffused all over in the intake manifold 26. The guide member 36 may be such a metal plate as is either welded on, or formed in one piece with the guidepipe 34. The end section of the guidepipe 34 adjacent the riser 20 is located where the maximum guantity of suctioned air remains unchanged. The guide member 36 is provided with a footing 38 in addition to the plate member arranged in parallel to the riser 20 with the side thereof properly bent to suit the purpose (FIG. 2). As a result, the guide pipe 34 and the plate-shaped guide member 36 are thus properly retained in place over a certain span above the riser 20 or over such a degree of span as keeps the maximum guantity of suctioned air at the time of the maximum output of an internal combustion engine, completely free from being subjected to fluctuations, without the need for subjecting the heat insulator 22 to any special processing whatsoever for that purpose.

Figure 3:
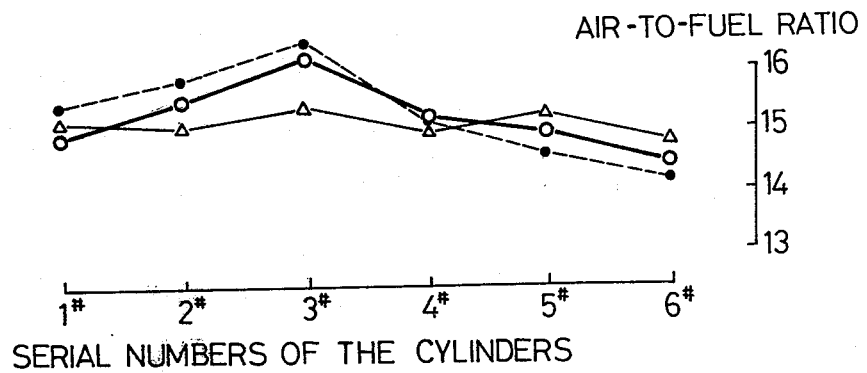
FIG. 3 is a graph showing the air-to-fuel ratios of respective cylinders.

Furthermore, now that the flow velocity of the mixed gas coming in contact with the riser 20 can be properly accelerated, by virtue of the presence of the guide member 36, without having to the intake manifold 26, the mixed gas is thus thoroughly vaporized, whereby the distribution and the air-to-fuel ratio of the mixed gas to be fed to respective cylinders are considerably improved, and the warming up properties of the apparatus in the cooled-down state is thus improved at the same time. One example of the degree of the improvement of the air-to-fuel ratio of such a mixed gas as is distributed to respective cylinders, properly effected by the application of the present invention, is as shown in FIG. 3.

What is claimed is:

1. A vaporizer accelerator apparatus comprising, in combination with a carburetor of an internal combustion engine that includes a planar riser, a suction port in communication with a cylinder of the engine and an intake manifold in communication with the suction port, a guidepipe extending from said carburetor into said intake manifold of said engine and spaced from said riser of said engine and a guide member provided at the end of said guidepipe in opposition to said riser, said guide member comprising an elongated plate extending over and in a plane that is substantially parallel to the plane of said riser, said guide member having a pair of feet provided at opposite sides of said plate, said feet cooperating with said riser to define a passageway that is open only at the axially opposed ends thereof thereby assuring the spacing of said guide member from said riser at a proper distance, the portion of said riser that is in opposition to said guide member defining a wall of the intake manifold, said wall being coplanar with the juncture of the suction port and the intake manifold.

2. A vaporizer accelerator apparatus as claimed in claim 1 wherein said guide member is placed in a position such that the quantity of suctioned air at the time of the maximum output of said engine is kept maximum.

3. A vaporizer accelerator comprising an elongated guidepipe having a first end that is capable of being placed in communication with the carburetor of an internal combustion engine, the second end of said guidepipe being adapted to be inserted into the intake manifold of the internal combustion engine, said vaporizer accelerator further comprising a planar, elongated member defined by a plate that is integral with said second end of said guidepipe such that said guide member extends over and is substantially parallel to the plane of the riser of the internal combustion engine, said guide member including a pair of feet provided at the opposite sides of said plate, said feet cooperating with said riser to define a passageway that is open only at the axially opposed ends thereof thereby assuring the spacing of said guide member from said riser at a proper distance, the portion of said riser that is in opposition to said guide member defining a wall of the intake manifold, said wall being coplanar with the juncture of the suction port and the intake manifold.

* * * * *